April 27, 1943.  I. KIRSCHENBAUM ET AL  2,317,467
SELF-VENTING VACUUM TRAP
Filed March 11, 1941
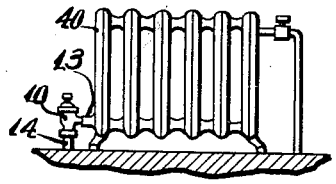
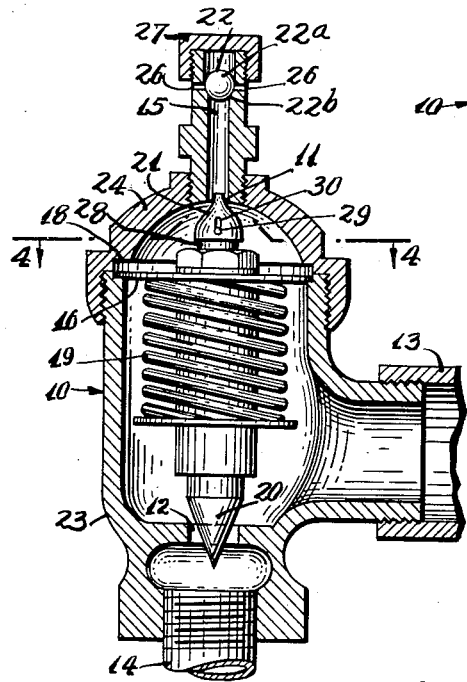
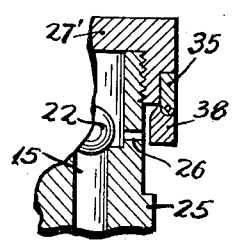
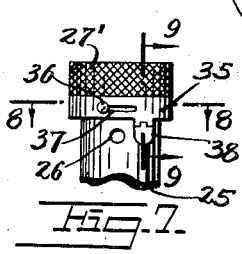
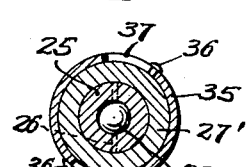
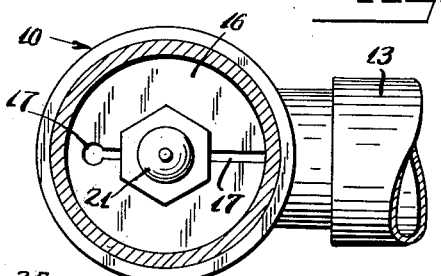
INVENTORS
*Irving Kirschenbaum*
*Harry McCabe*
BY
ATTORNEY Patented Apr. 27, 1943

2,317,467

UNITED STATES PATENT OFFICE 2,317,467

SELF-VENTING VACUUM TRAP

Irving Kirschenbaum and Harry McCabe,
New York, N. Y.

Application March 11, 1941, Serial No. 382,702

3 Claims. (Cl. 236—56)

This invention relates to new and useful improvements in a self-venting vacuum trap.

This invention particularly relates to improvements in those types of steam radiator traps in which the water and air pass from the steam inlet to a return line, and in which the steam expands a thermostat causing a valve to seat, at a desired temperature, so that the steam is locked in the radiator. As the steam condenses to water and cools the thermostat, the valve opens and permits the water to escape through the return line.

This invention particularly proposes that each steam radiator trap be provided with an air venting passage, and that the thermostat be provided with an additional valve (two in all) to control this passage in a certain way. It is also proposed that the air venting passage be provided with a one way valve for preventing inward passage of air. It is proposed to so arrange the two thermostat valves of the improved radiator trap that they close and open simultaneously. Thus when the thermostat becomes heated to a predetermined temperature both valves close, shutting off the steam return pipe and the air vent passage.

Upon cooling of the thermostat both valves open permitting the water to drain down through the return line and the air to escape through the venting air passage. This escaping air lifts the one way valve in this passage during this operation. The one way valve will not permit air to come into the trap, therefore a vacuum is created. This vacuum condition makes the suction to the boiler more efficient and will suck the water in the trap down through the return line more readily than if outside air would be permitted to enter the trap.

The improved trap is particularly useful where there is a great amount of air accumulating through the line due to a faulty condition inherent along the system. This type of trap will permit the excess air to escape through the venting air passage. Because the device permits the escape of air and permits the steam to reach the trap and return line simultaneously, the radiators will be heated much quicker.

Another important feature of this invention is that the device permits ready detection of a defective thermostatic element since the continuous escape of steam and vapor and air will produce a whistling sound. The invention also proposes modifications to assist in the detection of a defective trap.

The improved trap also prevents knocking and other hammer-like sounds due to it allowing the air to escape and not allowing the water to become bound in the radiator.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is an elevational view of a steam radiator from a steam system provided with a self-venting vacuum trap constructed in accordance with this invention.

Fig. 2 is an enlarged detailed view of the trap illustrated in Fig. 1.

Fig. 3 is a vertical sectional view of the trap shown in Fig. 2.

Fig. 4 is a horizontal sectional view taken on the line 4—4 of Fig. 3.

Fig. 5 is a fragmentary detailed view of a portion of Fig. 3, illustrated with certain parts broken away to disclose interior parts.

Fig. 6 is a fragmentary elevational view of the top portion of a trap constructed in accordance with a modified form of this invention.

Fig. 7 is a fragmentary elevational view of the top portion of another trap embodying another modified form of the invention.

Fig. 8 is a horizontal sectional view taken on the line 8—8 of Fig. 7.

Fig. 9 is a fragmentary enlarged vertical sectional view taken on the line 9—9 of Fig. 7.

The self-venting vacuum trap, in accordance with this invention, includes a valve casing 10 having opposed seats 11 and 12. The seat 12 is located in a passage extending through the casing from the steam inlet pipe 13 to the steam and water return pipe 14. The seat 11 is disposed in a passage between the steam inlet pipe 13 and an air vent 15. A member 16 is movably mounted within the casing 10. This member is in the form of a disc having a slotted opening 17 extended through it and through which air may pass. The disc 16 is movably supported by the fact that its edges are disposed within an annular recess 18 formed in the casing 10. The member 16 normally rests on the bottom shoulder of the recess 18. However, it may move upwards off this shoulder as will become clear as this specification proceeds.

A thermostat 19 is supported on the member 16. A valve 20 is mounted on one end of the thermostat 19, and a valve 21 is mounted on the other end of the thermostat 19. The valve 20 is cooperative with the seat 12 to control passage through this seat. The valve 21 is cooperative with the seat 11. The valves 20 and 21 and the thermostat 19 are so designed that normally the valves are in their open positions. However, when the thermostat 19 heats up to a predetermined heat it expands and soon simultaneously closes the valves 20 and 21.

A one way valve 22 controls the air vent passage 15 for preventing inward passage of air. This valve preferably includes a ball 22$^a$ which closes a valve seat 22$^b$ by gravity. The valve casing 10 is formed from several parts. There is a main part 23, a top cap 24 threadedly engaged on the top of the main part, and a tube 25 threadedly mounted upon the top cap 24. This tube 25 is provided with the passage 15. The bottom end of the tube 25 comprises the valve seat 11. The tube 25 has several small openings 26 extending through its sides and located above the normally closed position of the valve 22. A cap 27 threadedly engages on the free end of the tube 25. The valve 22 is capable of moving up slightly to allow air to discharge out of the valve casing 10. However, the valve 22 closes for preventing air from entering the casing 10.

The valve 21 is resiliently mounted, merely as a precaution to prevent damage to the thermostat 19. The arrangement is such that when the valves 20 and 21 are in their closed positions and the thermostat continues to expand, the resiliency of the mounting of the valve 21 takes up the additional expansion. Specifically, the valve 21 is slidably mounted on a post 28 from the member 16. A pin 29 is fixedly mounted on this post 28 and engages into slots 30 formed in the valve 21. A spring 31 is mounted within a hollow in the valve 21 and acts to normally urge the valve 21 upwards. With this arrangement the thermostat 19 may expand an additional amount after the valve 21 is upon its seat. This additional expansion is taken up by merely compressing the spring 31.

In Fig. 6 a modified form of the invention has been disclosed which is substantially identical to the prior form, distinguishing merely in the fact that the one-way valve 22' is spring loaded. A small weak spring 33 rests against the valve 22. This spring is held under slight compression by a screw 33' threadedly mounted through the cap 27. The spring 33 is merely for the purpose of making certain that the valve 22' closes. However, the valve 22' is free to lift to let out air from within the casing 10.

In Figs. 7 to 9 inclusive another modified form of the invention is disclosed which distinguishes from the prior form in the fact that means has been provided to assist in detecting a defective trap. This means is in the nature of a ring 35 slightly turnably mounted on the cap 27'. Several headed elements 36 are mounted on the cap 27' and extend through slots 37 formed in the ring 35. The ends of the slots 37 control the amount that the ring may be turned.

Small detector leaves 38 are pivotally mounted upon the bottom portions of the ring 35 and normally are located in positions in which they do not obstruct the openings 26 which are in the tube 25. However, to test whether or not an excessive quantity of air is being sucked in through the openings 26, which would mean that the valve 22 is not functioning properly, it is merely necessary to turn the ring 35 so that the leaves 38 are over the openings 26. The leaves 38 may then be flipped with a finger nail and their actions watched to determine whether they are being sucked or blown.

In Fig. 1 a conventional steam radiator 40 is illustrated provided with the steam discharge pipe 13 connected with a self-venting vacuum trap in accordance with this invention. The return pipe is indicated by numeral 14.

The operation of the device is as follows:

When the thermostat 19 is cool both valves 20 and 21 are open. The steam from the steam radiator system may therefore quickly enter the steam radiator and reach the pipe 13 and enter the casing 10. Air will be discharged through the venting passage 15 and the openings 26. Water will pass through the return pipe 14. When the steam reaches the thermostat 19 it will heat the thermostat which then expands, simultaneously, or nearly simultaneously, closing the valves 20 and 21. The steam radiator is now at its correct heat. When steam within the radiator condenses the temperature of the thermostat 19 falls and both valves 20 and 21 simultaneously open. This permits additional steam to enter and permits only water to pass through the return pipe 14 as initially explained. This cycle keeps on repeating.

However, if the thermostat 19 breaks or becomes defective the valves 20 and 21 will remain open. This short circuits radiators of the steam system. Then steam may freely pass through the pipe 13, the casing 10, the pipe 14 and the air vent passage 15 and openings 26. It is easily detected at the openings 26 as it produces a whistling sound. This indicates the defective trap.

While we have illustrated and described the preferred embodiments of our invention, it is to be understood, that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. In a self venting vacuum trap having a hollow body with a top opening, a tube extending from said top opening, a cap closing the top end of said tube, radial passages extending from said tube at a point below said cap, a one-way valve in said tube at a point below said passages and arranged to permit the egress of air through said passages, and means for testing said passages to determine whether or not air is escaping from said passages, comprising a ring mounted on the bottom of said cap, and a leaf for each of said passages pivotally mounted on the bottom of said ring and depending therefrom in a position in which they are slightly spaced from said tube and extendable across said passages in turned positions of said ring to be oscillated by air escaping from said passages.

2. In a self venting vacuum trap having a hollow body with a top opening, a tube extending from said top opening, a cap closing the top end of said tube, radial passages extending from said tube at a point below said cap, a one-way valve in said tube at a point below said passages and arranged to permit the egress of air through said passages, and means for testing said passages to determine whether or not air is escaping from said passages, comprising a ring mounted on the bottom of said cap, and a leaf for each of said passages pivotally mounted on the bottom of said ring and depending therefrom in a position in which they are slightly spaced from said tube and extendable across said passages in turned positions of said ring to be oscillated by air escaping from said passages, and means for rotatively supporting said ring on said cap.

3. In a self venting vacuum trap having a hollow body with a top opening, a tube extending from said top opening, a cap closing the top end of said tube, radial passages extending from said tube at a point below said cap, a one-way valve in said tube at a point below said passages and arranged to permit the egress of air through said passages, and means for testing said passages to determine whether or not air is escaping from said passages, comprising a ring mounted on the bottom of said cap, and a leaf for each of said passages pivotally mounted on the bottom of said ring and depending therefrom in a position in which they are slightly spaced from said tube and extendable across said passages in turned positions of said ring to be oscillated by air escaping from said passages, and means for rotatively supporting said ring on said cap, comprising pins passed through elongated slots formed in said ring and engaging said cap.

IRVING KIRSCHENBAUM.
HARRY McCABE.